United States Patent [19]

Frederiksen

[11] Patent Number: 4,777,650
[45] Date of Patent: Oct. 11, 1988

[54] DUAL CAVITY PRESSURE MICROPHONES

[75] Inventor: Erling Frederiksen, Holte, Denmark
[73] Assignee: A/S Brüel & Kjar, Narum, Denmark
[21] Appl. No.: 862,019
[22] Filed: May 12, 1986
[30] Foreign Application Priority Data May 28, 1985 [DK] Denmark .................................. 2355/85

[51] Int. Cl.$^4$ ........................ H04R 19/04; H04R 1/02; H04R 1/28
[52] U.S. Cl. ..................................... 381/174; 381/154; 381/159; 381/161; 381/169; 381/191
[58] Field of Search ............... 381/174, 169, 188, 153, 381/154, 159, 161, 182, 191, 186

[56]  References Cited

U.S. PATENT DOCUMENTS

| 2,852,620 | 9/1958 | Schoeps et al. | 381/188 |
| 3,007,012 | 10/1961 | Olson | 381/174 |
| 3,944,756 | 3/1976 | Lininger | 381/174 |
| 4,117,275 | 9/1978 | Miyanaga et al. | 381/174 |
| 4,170,721 | 10/1979 | Ishibashi et al. | 381/174 |

FOREIGN PATENT DOCUMENTS

| 808593 | 7/1951 | Fed. Rep. of Germany | 381/174 |
| 884516 | 7/1953 | Fed. Rep. of Germany | 381/174 |
| 1011467 | 7/1957 | Fed. Rep. of Germany | . |
| 51-35251 | 8/1976 | Japan | 381/174 |
| 58-215900 | 12/1983 | Japan | 381/191 |
| 582595 | 11/1977 | U.S.S.R. | 381/174 |
| 1205808 | 9/1970 | United Kingdom | . |

Primary Examiner—Jin F. Ng
Assistant Examiner—Danita R. Byrd
Attorney, Agent, or Firm—Scully, Scott, Murphy & Presser

[57]  ABSTRACT

A dual cavity pressure microphone comprising a microphone housing and an oscillating element mounted in or on said housing. The oscillating element including a membrane which is in principle only sensitive to a sound field on one side, the second side forming part of a closed cavity in the microphone housing, said cavity being connected to the ambient atmosphere through a narrow pressure equalizing channel. The microphone comprises an additional cavity representing an additional acoustic capacitance and an additional pressure equalizing channel located in series therewith and representing an additional acoustic resistance, the second capacitance and the second resistane being located in series with the capacitance and resistance, respectively, of the first cavity and the first channel in such a manner, that the pressure equalization of the microphone is also effected through the additional pressure equalizing channel and the additional cavity. According to the invention the additional pressure equalizing channel is dimensioned in such a manner that it substantially only provides a static pressure equalization.

7 Claims, 4 Drawing Sheets

DUAL CAVITY PRESSURE MICROPHONES

BACKGROUND OF THE INVENTION

A device for use in a pressure microphone or in connection with a pressure microphone comprising a microphone housing and an oscillating element mounted in or on said housing, a membrane, which is in principle only sensitive to a sound field on one side, the second side forming part of a closed cavity in the microphone housing, said cavity representing a first acoustic capacitance and being connected to the ambient atmosphere through a narrow pressure equalizing channel representing a first acoustic resistance, said device comprising an additional cavity representing an additional acoustic capacitance and an additional pressure equalizing channel located in series therewith and representing an additional acoustic resistance. The second capacitance and the second resistance are located in series with the capacitance and the resistance, respectively, of the first cavity and the first channel in such a manner that the pressure equalization of the microphone is also effected through the additional pressure equalizing channel and the additional cavity.

DESCRIPTION OF THE PRIOR ART

The invention is of particular importance in connection with measuring microphones. Measuring microphones have been extensively used for measuring sound pressures. In many acoustic tests it has, however, been more expedient to measure the sound intensity, which is a vector size, rather than the sound pressure, which is a scalar size. The sound intensity of a sound source is definable e.g. by means of integration of the sound intensity over a surface surrounding the sound source, in which case no particularly anechoic chamber will be needed. Even a strong background noise will not affect the measuring results in an unfortunate direction, as the sound sources outside the surrounding surface of integration do not contribute to the integrated sound intensity. Localization and identification of sound sources, tracing of lines of flow for the sound energy, e.g. in the interior of vehicles, and investigation of the sound absorption as a function of the angle of incidence of the sound may be mentioned as other fields of application.

Intensity measuring is often based on a two-microphonetechnique e.g. as described by Finn Jacobsen in report No. 28 from Danmarks Tekniske Hojskole, Akustisk Laboratorium (the Technical University of Denmark, Acoustic Laboratory): "Measuring sound intensity". Briefly, the method is based on the approximation that the intensity vector in a stationary sound field in a specific point is equal to the temporal average value of the product between the instantaneous pressure and the corresponding particle velocity in the same point, and that the vector of the particle velocity can be deduced from the sound pressure gradient in the point. This pressure gradient is approximately equal to the difference in pressure between two points located at a small distance from the reference point divided by the distance between the two measuring points.

The condition of the method being applicable in practice and particularly at low frequencies are that the two pressure microphones match extremely well, especially with respect to their phase characteristics, if measuring errors should be avoided. A measuring of and a selection among many types of microphones or a complicated and time-consuming adjustment of the actual pair of microphones are thus required.

The phase matching problem in connection with wellknown measuring microphones with a lower threshold frequency in the range of 0.1-20 Hz to be used in the above mentioned intensity measuring mounting in the two-microphone-technique, is illustrated by the fact that a phase difference of 0.1° at 20 Hz corresponds to a change in effective microphone distance, i.e. the distance between the acoustic centers of the microphone pair, of about 4.8 mm corresponding to about 10 percent of the typical distance between the fixed microphones. The phase shift at low frequencies is caused by the construction of the pressure microphones. The microphones are preferably capacitor-pressure microphones, the output signal of which is proportional to the difference between the pressure on the front of the membrane and the pressure on the rear side of the microphone. To ensure that the static pressure, the atmospheric pressure, is of the same value outside the microphone and inside the microphone, a narrow pressure equalizing channel connects the space between the membrane with the ambient atmosphere, so that variations in the atmospheric pressure, which are effected very slowly, may be equalized through the channel. The channel is so narrow that dynamic differences in pressure caused by the propagation of the sound do not influence the rear side of the membrane, if only the frequency is relatively high, e.g. 1 Hz or more. However, undesirable high phase errors occur at lower frequencies in connection with intensity measuring, these dynamic differences in pressure being effected so slowly that the effect thereof may propagate through the pressure equalizing channel to the rear side of the membrane.

The acoustic impedance of the channel can be equalized electrically be an ohmic resistance, whereas the cavity behind the membrane may be equalized by a capacitor having a certain capacitance. At the lower threshold frequencies of the microphone, where the sensitivity has been decreased by 3 dB, these impedances are equally high and the phase shift thus 45°. If the frequency is increased by ten times the lower threshold frequency, the reactance of the cavity is reduced by a factor ten, whereas the resistance of the channel remains practically unchanged. As the pressure in the cavity has been shifted about 90° relative to the pressure in front of the membrane, the phase shift will be almost equal to Arctan 0.5=5.7° for a microphone, the lower threshold frequency of which is equal to 2 Hz, whereas it is about 2.85° for a microphone with a lower threshold frequency of 1 Hz. This means that the lower threshold frequency of the two microphones is comparatively decisive for the phase shift to be introduced. A change of the lower threshold frequency of only 0.0035 Hz causes a phase shift to 0.1°. It is thus illustrated how crucial the phase shift problem is to the two microphones to be used in the intensity measuring.

SUMMARY OF THE INVENTION

A device for use in microphones of the above mentioned type is according to the invention characterized in that the additional pressure equalizing channel is dimensioned in such a manner that it substantially only provides a static pressure equalization.

By allowing the pressure equalization to take place between an additional equalizing channel and an additional cavity two acoustic RC-links in series expressed in analogy with electric terms are obtained. At suitable dimensioning this involves that the dynamic pressure in the interior of the microphone is reduced twice by essentially the same factor. By using the same example as above for a microphone with a lower threshold frequency of 20 Hz, a reduction is obtained of the pressure in the first link to 1/10 of the pressure at the front of the membrane and an another ten times reduction of the pressure in the second link, so that the pressure on the rear side of the membrane has been reduced by a factor of 100. This alone will cause a smaller phase shift at lower frequencies. It should be added that the dynamic differences in pressure (the signal) propagating to the inside of the microphone, more specifically to the rear side of the membrane, is phase shifted 90° through each of the two RC-links, so that the total phase shift amounts to 180°. As a given influence on the rear side of the membrane is equal to a 180° phase shifted influence on the front of the membrane, the total phase shift will amount to 360°. Thus the total result of the measuring will be that the phase shift of the microphone is strongly reduced concurrently with its sensitivity being increased to a small extent. In other words, a comparatively big and inconvenient phase error will, be means of the device according to the invention, be converted into a small amplitude error. A small error in sensitivity (amplitude error) is, however, better than a phase error in connection with intensity measurings, cf. above.

Beyond influencing the phase characteristic of a microphone in connection with its lower threshold frequency it is also possible by means of a device according to the invention to influence the amplitude characteristic, as the lower threshold frequency may be displaced towards lower frequencies by adding an additional acoustic RC-link of a suitably low cut-off frequency.

It is furthermore possible to simplify the calibration of microphones individually or in pairs, the influence of the pressure equalizing channel on the frequency characteristics essentially being eliminated, so that it is no longer necessary to provide for the existence of the pressure equalizing channel.

A microphone is known from German Auslegeschrift No. 1.011.467 provided with an additional device in the form of an acoustic phase-shifting section. This phase shifting section has the effect that the microphone is provided with a particular directional characteristic; as a result it may be used for measuring pressure gradients.

BRIEF DESCRIPTION OF THE DRAWING

The invention will be described more detailed below with reference to the accompanying drawing, in which.

DESCRIPTION OF PREFERRED EMBODIMENTS

Figure 1:
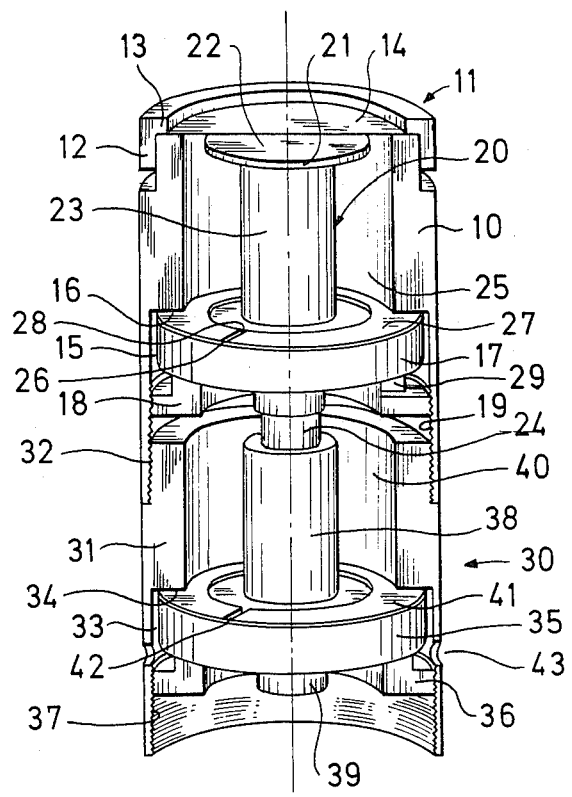
FIG. 1 illustrates a capacitor-pressure microphone with a device according to the invention mounted thereon.

FIG. 1 illustrates a capacitor-pressure microphone with a device according to the invention. The microphone comprises an outer microphone housing 10 substantially formed as a cylindrical element of construction. A membrane element, provided with the general reference number 11, is mounted on the microphone housing 10 in the upper end as illustrated in the drawing. The membrane element consists of a short cylindrical socket 12 with flanges 13 which together with the microphone housing 10 stretch a membrane 14. This membrane constitutes the movable electrode of the microphone. The membrane element 11 is screwed onto or otherwise fastened to the microphone housing 10, so that an electrically conducting connection is established between the housing 10 and the membrane 14. The inner side of the microphone housing 10 is provided with a recess 15 with an abutting surface 16 for a disc-shaped insulator 17. The insulator 17 is retained in the microphone housing 10 by means of a retaining ring 18 screwed in at a thread 19 on the inner side of the housing.

In its center, the insulator 17 carries a stationary electrode 20, in technical terms also called the rear electrode or the rear plate. The electrode 20 consists of a head 21 with a plane surface 22 constituting the actual, stationary capacitor plate and a stem-formed part 23 inserted through the insulator 17 and ending in a terminal 24 of an electrically well conducting material.

The membrane element 11, the microphone housing 10, the rear electrode 20 and the insulator 17 thus confine an air-filled space or a cavity 25 only connected to the ambient atmosphere through a pressure equalizing channel 26. The channel may be established in several ways. In some microphones the pressure equalizing channel is provided by a perforation of the wall of the microphone housing, whereafter the necessary acoustic resistance is provided by leading a thread of a suitable thickness through the channel 26. The pressure equalizing channel 26 is provided in a different manner in the embodiment illustrated in the drawing. A thin spacer 27 is inserted between the abutting surface 16 in the recess 15 of the microphone and the insulator, in which spacer a narrow strip 28 is cut out. The acoustic resistance of the pressure equalizing channel is defined by the width of the cut-out strip, typically of a magnitude of 100 μm, by the thickness of the spacer 27, typically of a magnitude of 10 μm, and by the width of the spacer, typically of a magnitude of 1500 μm. The passage between the insulator 17 and the inner side of the microphone housing in the recess 15 is so wide that it yields no noticeable resistance. The ventilation of this passage to the ambient atmosphere takes place through a recess 29 in the retaining ring 18.

This known pressure equalizing system is as mentioned in the introduction the reason why the microphone at low frequencies shows phase shifts of a magnitude which is inconvenient and primarily creates problems in connection with the matching of microphones for use in intensity measurings. In order to remedy this disadvantage, a device consisting of an extension, provided with the reference number 30, of the microphone housing is mounted on the known microphone as illustrated in FIG. 1 according to the invention.

The extension is illustrated in the drawing as an extension which can be srewed onto an existing microphone at a thread 19 in the socket end and can thus constitute an adapter. This device may also be formed integral with the microphone and thus constitute an integral part thereof.

The adapter 30 comprises a pipe section 31 which in some cases may be provided with a thread 32 on the outside for engaging the thread 19 of the microphone in the socket end, and in other cases it is merely an extension of the microphone housing 10. The pipe section 31 is at the bottom of the drawing provided with a recess 33 having a radially extending abutting surface 34 for a second insulator 35 retained by means of a second retaining ring 36 being screwed in at an inner thread 37, also used for coupling the remaining measuring and power equipment. In its center the insulator 35 carries an electric conductor 38 inserted-through the insulator and ending in a terminal leg 39 for establishing the electric connection from the terminal 24 of the rear plate 20 to the outer equipment (not shown). As illustrated in the Figure the pipe section 31 and the two insulators 17 and 35 confine an additional cavity 40 being connected through the pressure equalizing channel 26 with the upper cavity 25 and thus with the rear side of the membrane 14. In order to establish contact with the ambient atmosphere a thin spacer 41 has been inserted between the abutting surface 34 of the pipe section 31 and the second insulator 35. A narrow strip has been removed from the spacer in order to establish an additional pressure equalizing channel 42 which can be dimensioned to obtain a desirable acoustic resistance. The passage between the second insulator 35 and the inner side of the pipe section 31 in the recess 33 is also here of such a width, that it yields no noticeable resistance. The ventilation through this passage to the ambient atmosphere takes place through suitable perforations 43 in the wall of the pipe section 31.

Dynamic pressure variations are transmitted at low frequencies from the front of the membrane 14 to the rear of the membrane through the additional pressure equalizing channel 42, the additional cavity 40, further through the first pressure equalizing channel 26 and the first mentioned cavity 25 by means of the inventive device. This acoustic path of wave may be equalized by means of two RC-links connected in series phase shifting the signal 90° twice. The advantages mentioned above will thus be obtained.

Figure 2:
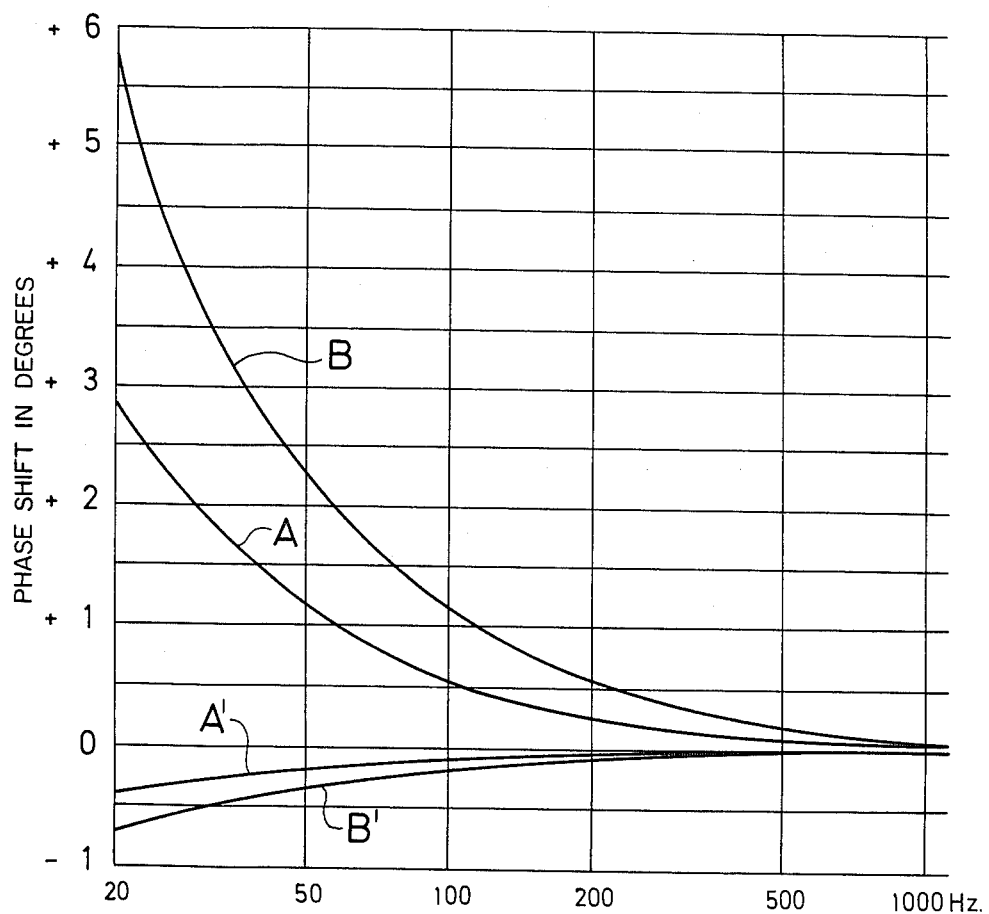
FIG. 2 illustrates curves of the phase shift at lower frequencies for two pressure microphones at different lower threshold frequencies, without, and with a device according to the invention mounted thereon.

FIG. 2 illustrates four curves showing the phase shift in the vicinity of the lower threshold frequency of two microphones with different lower threshold frequencies, with and without the inventive device. Curve A shows the phase shift of a microphone, the lower threshold frequency of which is equal to 1 Hz, whereas A' shows the phase shift of the same microphone, on which an 1 Hz adapter has been mounted, namely an adapter, the lower threshold frequency of which is equal to 1 Hz. The curves clearly illustrate the improvement obtained, the phase shift with the inventive adapter being kept within ±0.3° down to about 20 Hz compared to 200 Hz without adapter. Curve B illustrates the phase shift of a microphone, the lower threshold frequency of which is equal to 2 Hz, whereas curve B' illustrates the phase shift of the same microphone with a 1 Hz adapter mounted thereon. The essential feature is that the difference in the lower threshold frequencies of the microphones causes a noticeable difference in the phase shift at lower frequencies, when the microphones operate without an adapter, cf. the example at 20 Hz, where the difference in the phase shift is 2.85°. This difference in the phase shift is, however, reduced considerably when the microphones are provided with an adapter, cf. the example with 20 Hz, where the difference in the phase shift between the two microphones is now only about 0.3°. Consequently, the lower threshold frequencies of the microphones are no longer so critical. It is furthermore illustrated that the phase shift of the modified microphones will only be of importance at far lower frequencies.

Figure 3:
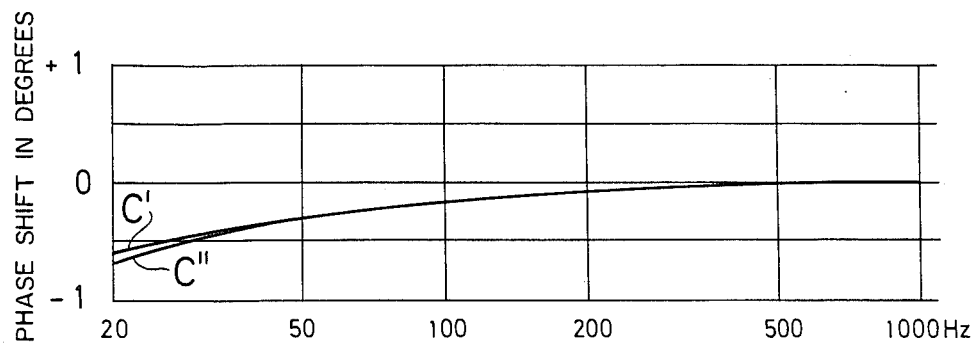
FIG. 3 illustrates curves of the phase shift at lower frequencies for a pressure microphone with devices according to the invention mounted thereon and with different lower threshold frequencies for the devices.

FIG. 3 illustrates calculating phase shifting curves of a microphone, on which an adapter with different time constants has been mounted. It appears that the threshold frequency of the adapter is not critical. The lower threshold frequency of the microphone used is 2 Hz corresponding to curve B in FIG. 2. The calculated curve C' relates to the microphone, on which an adapter with a time constant of 0.08 seconds has been mounted, whereas the curve C'' relates to the microphone with an adapter having a time constant of 0.16 seconds mounted thereon. The curves are congruent down to about 40 Hz and diverge hereafter to about 0.1° at 20 Hz. It thus appears that the separate time contants of the adapter constitute no critical parameter.

Figure 4:
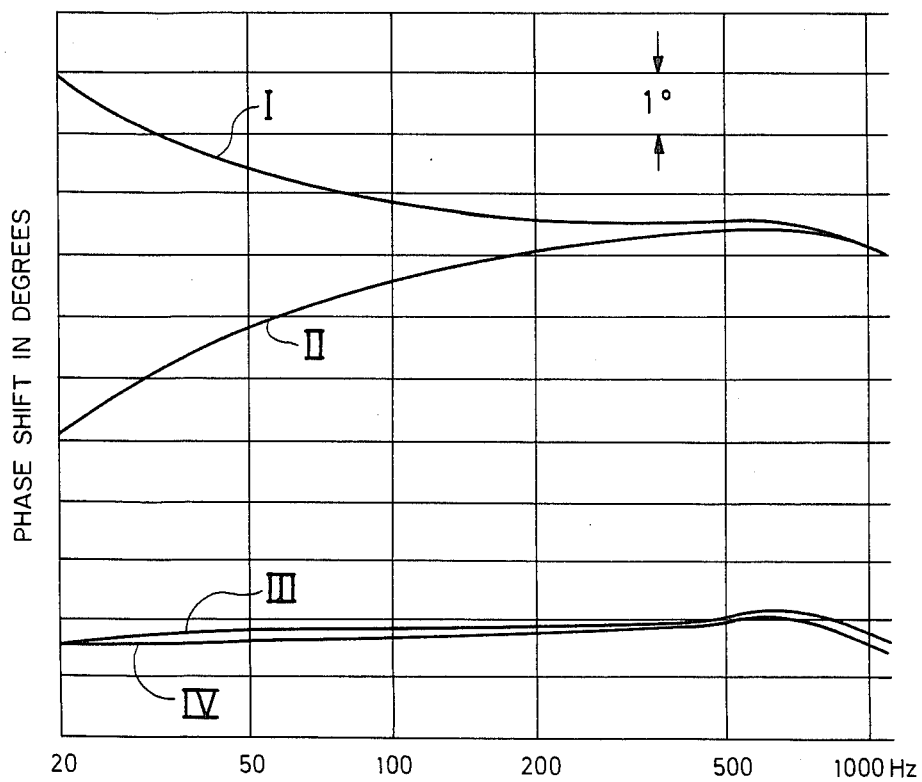
FIG. 4 illustrates curves of the phase difference at lower frequencies between two microphone channels, partly with reversed microphones, partly with devices according to the invention mounted thereon.
Figure 5:
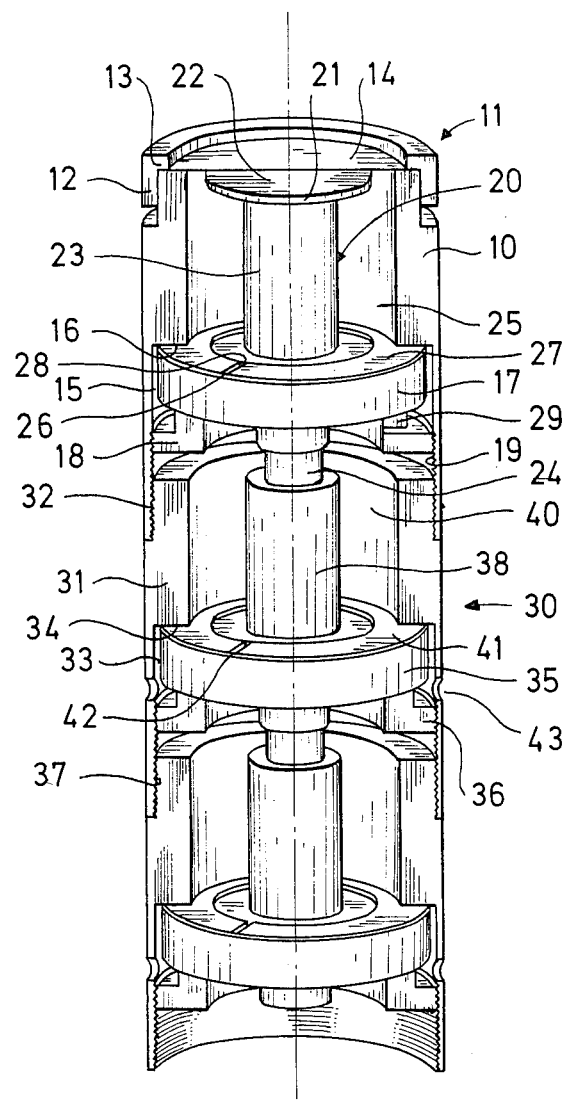
FIG. 5 illustrates a pressure microphone with two devices according to the invention mounted thereon.

FIG. 4 illustrates the effect of an inventive device on the phase shift of a microphone channel at lower frequencies, i.e. in the range of frequency of 20 Hz to 1 kHz. Curves I and II illustrate the measured phase shift between two microphone channels, channel a and channel b, where the microphones used, microphone A and microphone B, are traditionally constructed as regards the pressure equalization.

Curve I illustrates the measured difference in frequency as a function of the frequency between channel a and channel b, where microphone A has been connected with channel a and microphone B with channel b, whereas curve II illustrates the measured phase difference between the same two channels, but with reversed microphones, i.e. where microphone B has been connected with channel a and microphone A with channel b. A unit on the ordinate corresponds to a phase difference of 1°. These curves clearly illustrate that the individual, traditionally constructed microphones at lower frequencies have a very great influence on the phase characteristics of the microphone channels. If a device according to the invention is, however, mounted on the microphones, two new curves, curve III and curve IV, are obtained in connection with a repetition of the measurings of the phase difference between channel a and channel b, said curves III and IV being almost congruent in the entire range of frequency from 20 Hz to 1 kHz and extending practically in horizontal direction. The last two curves clearly show that a reversal of the modified microphones between the two channels have no effect on the phase characteristics of the microphone channels as is the case in connection with the two non-modified microphones. Furthermore, the curves clearly illustrate that microphones modified according to the invention have the additional effect that the phase difference remains the same in the entire frequency range, the curves III and IV extending in horizontal direction.

In an particularly advantageous embodiment the capacitor pressure microphone is provided with two devices according to the invention. An additional phase shift of 90° of the undesirable component is thus obtained influencing the rear side of the membrane. The undesirable component is, however, further reduced, so that is has no effect in practice.

There is nothing to prevent additional microphones from being mounted and the undesirable component is reduced concurrently with the number of devices being mounted. In connection with an uneven number of devices the phase error will be 0°.

I claim:

1. A dual cavity pressure microphone comprising a microphone housing (10) and an oscillating element mounted to said housing, said oscillating element including a membrane (14) having two sides, said membrane being sensitive to a sound field on one side thereof, a cavity being defined between a first insulating element and a second of said membrane in said housing, said cavity representing a first acoustic capacitance and being connected to the ambient atmosphere through a narrow pressure equalizing channel (26) representing a first acoustic resistance, and an additional cavity (40) representing an additional acoustic capacitance and an additional pressure equalizing channel (42) located in series therewith and representing an additional acoustic resistance, the additional cavity (40) being defined between the first insulating element and a second insulating element spaced from said first insulated element, the additional acoustic capacitance and resistance being located in series with the first acoustic capacitance and resistance, respectively, of the first cavity (25) and the first channel (26) in such a manner that the pressure equalization of the microphone is also effected through the additional pressure equalizing channel and the additional cavity, wherein the additional pressure equalizing channel is dimensioned in such a manner that it substantially only provides a static pressure equalization.

2. A dual cavity pressure microphone as claimed in claim 1, characterized by the additional cavity (40) and the additional pressure equalizing channel (42) being within an extension (30) integral with said microphone housing (10).

3. A dual cavity pressure microphone as claimed in claim 2, in which the pressure microphone includes a stationary electrode (20) mounted on said first insulating element (17) in said housing, and wherein said membrane being an electrode movable in relation to said first insulating element and placed at one end of the microphone housing, and in which said cavity (25) is a substantially closed cavity confined between the housing, the stationary electrode, the membrane and the first insulating element and wherein the additional cavity (40) and the additional pressure equalizing channel (42) being between the said first insulating element (17) and said second insulating element (35) carried by an electric conductor (38) in said extension (30) integral with a second end of the microphone housing.

4. A dual cavity pressure microphone as claimed in claim 1, characterized in that the additional cavity and the additional pressure equalizing channel are provided in an extension (30) in the form of a separate adapter detachably mounted to said microphone housing.

5. A dual cavity pressure microphone as claimed in claim 1, characterized by comprising several acoustic RC-links coupled in series and providing a substantially static pressure equalization.

6. A dual cavity pressure microphone as claimed in claim 5, characterized by comprising an uneven number of acoustic RC-links providing a substantially acoustic pressure equalization.

7. A dual cavity pressure microphone as claimed in claim 6, characterized by comprising three acoustic RC-links

* * * * *

UNITED STATES PATENT AND TRADEMARK OFFICE
CERTIFICATE OF CORRECTION

PATENT NO. : 4,777,650

DATED : October 11, 1988

INVENTOR(S) : Erling Frederiksen

It is certified that error appears in the above-identified patent and that said Letters Patent is hereby corrected as shown below:

Column 1, lines 47-48: "two-microphonetechnique" should read as --two-microphone-technique--

Column 2, line 37: "be" should read as --by--

Column 2, line 56: "to" should read as --of--

Column 3, line 24: "be" should read as --by--

Signed and Sealed this

Seventh Day of November, 1989

*Attest:*

JEFFREY M. SAMUELS

*Attesting Officer*     *Acting Commissioner of Patents and Trademarks*

UNITED STATES PATENT AND TRADEMARK OFFICE
CERTIFICATE OF CORRECTION

PATENT NO. : 4,777,650

DATED : October 11, 1988

INVENTOR(S) : Erling Frederiksen

It is certified that error appears in the above-identified patent and that said Letters Patent is hereby corrected as shown below:

```
        Column 6, line 68:  "is"  should read as
--it--
        Column 7, line 13, Claim 1:  after "second"
insert --side--
```

Signed and Sealed this

Eighteenth Day of September, 1990

*Attest:*

HARRY F. MANBECK, JR.

*Attesting Officer*      *Commissioner of Patents and Trademarks*